(12) United States Patent
Kim

(10) Patent No.: US 8,549,660 B2
(45) Date of Patent: Oct. 1, 2013

(54) CANTILEVER-BASED OPTICAL FIBER PROBE INTERFACIAL FORCE MICROSCOPE FOR PARTIAL IMMERSION IN LIQUID

(75) Inventor: Byung Kim, Boise, ID (US)

(73) Assignee: Boise State University, Boise, ID (US)

( * ) Notice: Subject to any disclaimer, the term of this patent is extended or adjusted under 35 U.S.C. 154(b) by 603 days.

(21) Appl. No.: 12/757,542

(22) Filed: Apr. 9, 2010

(65) Prior Publication Data

US 2011/0252512 A1    Oct. 13, 2011

(51) Int. Cl.
*G01Q 70/14*    (2010.01)
*G01Q 30/14*    (2010.01)

(52) U.S. Cl.
USPC ............................................ 850/15; 850/59

(58) Field of Classification Search
USPC ........................................ 850/14, 15, 30, 59
See application file for complete search history.

(56) References Cited

U.S. PATENT DOCUMENTS

| | | | |
|---|---|---|---|
| 5,329,236 A | 7/1994 | Gemma et al. | |
| 5,357,105 A | 10/1994 | Harp et al. | |
| 5,821,409 A * | 10/1998 | Honma et al. | 850/14 |
| 6,006,594 A | 12/1999 | Karrai et al. | |
| 6,388,239 B1 * | 5/2002 | Muramatsu | 250/201.3 |
| 6,452,170 B1 | 9/2002 | Zypman et al. | |
| 6,530,266 B1 | 3/2003 | Adderton et al. | |
| 6,583,411 B1 | 6/2003 | Altmann et al. | |
| 6,596,992 B2 | 7/2003 | Ando et al. | |
| 6,672,144 B2 | 1/2004 | Adderton et al. | |
| 6,708,556 B1 | 3/2004 | Kim et al. | |
| 6,713,743 B2 | 3/2004 | Kim et al. | |
| 6,718,821 B1 | 4/2004 | Houston et al. | |
| 6,806,958 B2 | 10/2004 | Kojima et al. | |
| 6,862,921 B2 | 3/2005 | Chand et al. | |
| 6,929,934 B1 * | 8/2005 | Korchev et al. | 850/15 |
| 6,975,129 B2 | 12/2005 | Chang | |

(Continued)

FOREIGN PATENT DOCUMENTS

| | | |
|---|---|---|
| JP | 3140842 | 6/1991 |
| JP | 6174459 | 6/1994 |
| JP | 2002107284 | 4/2002 |

OTHER PUBLICATIONS

Bonander et al., "Cantilever Based Optical Interfacial Force Microscope", Mar. 14, 2008, pp. 1-3, vol. 92, No. 103124, Publisher: Applied Physics Letters.

(Continued)

*Primary Examiner* — David A Vanore
*Assistant Examiner* — Brooke Purinton
(74) *Attorney, Agent, or Firm* — Parsons Behle & Latimer

(57) ABSTRACT

An apparatus may comprise an optical detector configured to detect an optical beam reflected from a cantilever. The apparatus may further comprise an optical fiber probe suspended from the cantilever and a piezotube configured to move a sample substance in proximity to the optical fiber probe. The cantilever may be configured to deflect in response to an interfacial force between the sample substance and the optical fiber probe. The apparatus may further comprise a feedback controller communicatively coupled to the optical detector and a semiconductive circuit element abutting the cantilever. In response to detecting movement of the optical beam reflected from the cantilever, the feedback controller may apply a voltage to the semiconductive circuit element, which may reduce deflection of the cantilever. The voltage applied by the feedback controller may indicate a strength of the interfacial force between the sample substance and the optical fiber probe.

18 Claims, 4 Drawing Sheets

(56) References Cited

U.S. PATENT DOCUMENTS

| | | |
|---|---|---|
| 7,093,509 B2 | 8/2006 | Shao et al. |
| 7,105,301 B2 | 9/2006 | Su et al. |
| 7,204,131 B2 | 4/2007 | Adderton et al. |
| 7,234,343 B2 | 6/2007 | Ducker et al. |
| 7,241,994 B2 | 7/2007 | Hasegawa et al. |
| 7,278,296 B2 | 10/2007 | Kitamura |
| 7,347,085 B2 | 3/2008 | Taber |
| 7,425,698 B2 | 9/2008 | Warren et al. |
| 2002/0104963 A1 | 8/2002 | Mancevski |
| 2006/0255818 A1* | 11/2006 | Altmann et al. ............. 324/754 |
| 2007/0290130 A1 | 12/2007 | Shikakura et al. |
| 2008/0307864 A1* | 12/2008 | Uchihashi et al. ............. 73/105 |
| 2009/0032706 A1 | 2/2009 | Prater et al. |
| 2009/0045336 A1 | 2/2009 | Bloess et al. |
| 2009/0229020 A1 | 9/2009 | Adams et al. |
| 2010/0154085 A1* | 6/2010 | Maruyama et al. ............. 850/32 |

OTHER PUBLICATIONS

T. Sulcheck et al, "High-speed atomic force microscopy in liquid", May 2000, pp. 2097-2099, vol. 71, No. 5, Review of Scientific Instruments, American Institute of Physics.

Byung Kim, "IDBR: RUI: Development of a Cantilever Based Optical Interfacial Force Microscope", Mar. 25, 2010, Award No. 0852886, National Science Foundation, Division of Biological Infrastructure.

Kim et al, "Humidity Dependent Ordering of Water and Its Effect on Adhesion and Friction between Silica Surfaces", Oct. 14, 2007, vol. Abstract # 1353, AVS 54th International Symposium, Tribology Featured Topic.

Kim et al., "Scanning Probe Microscopy of Interfacial Water Confined Between Silica Surfaces", Nov. 8, 2009, Abstract # 1070, AVS 56th International Symposium & Exhibition, Surface Science Division.

* cited by examiner

CANTILEVER-BASED OPTICAL FIBER PROBE INTERFACIAL FORCE MICROSCOPE FOR PARTIAL IMMERSION IN LIQUID

GOVERNMENT RIGHTS

The U.S. Government may have rights in this invention pursuant to the terms of Grant No. 0852886 awarded by the National Science Foundation.

TECHNICAL FIELD

The present invention relates generally to interfacial force microscopy and more specifically to a cantilever-based optical interfacial force microscope.

BACKGROUND

Traditional microscope systems are generally unable to measure intermolecular interactions accurately and cost effectively. One type of microscope system is the atomic force microscope (AFM), which has been used to image and/or measure the topography of various surfaces. AFM's, however, suffer from a mechanical instability that prevents the accurate measurement of intermolecular interactions. In particular, AFM's are generally unable to control tip snap-off during tip retraction. As a result, AFM's are generally unable to detect intermediate states of various intermolecular interactions such as, for example, the unbinding processes of bio-molecular complexes.

Another type of microscope system is the interfacial force microscope (IFM). Traditional IFM's use an electrical detection process to measure various surface phenomena. IFM's, however, have not been widely used due to the low sensitivity and technical complexity of their electrical detection process. Thus, traditional microscope systems have generally been unable to measure intermolecular interactions accurately and cost effectively.

SUMMARY

In accordance with the present disclosure, the disadvantages and problems associated with prior microscope systems have been substantially reduced or eliminated.

In some embodiments, an apparatus comprises an optical detector configured to detect an optical beam reflected from a cantilever. The apparatus may further comprise an optical fiber probe suspended from the cantilever. The apparatus may further comprise a piezotube configured to move a sample substance in proximity to the optical fiber probe, the cantilever configured to deflect in response to an interfacial force between the sample substance and the optical fiber probe. The apparatus may further comprise a feedback controller communicatively coupled to the optical detector and a semiconductive circuit element abutting at least one surface of the cantilever. In response to detecting a movement of the optical beam reflected from the cantilever, the feedback controller may apply a voltage to the semiconductive circuit element, which may cause the semiconductive circuit element to reduce deflection of the cantilever. The voltage applied by the feedback controller may indicate the strength of the interfacial force between the sample substance and the optical fiber probe.

In other embodiments, a method comprises positioning a sample substance in proximity to an optical fiber probe suspended from a cantilever. An interfacial force between the sample substance and the optical fiber probe may cause the cantilever to deflect. The method may further comprise detecting an optical beam reflected from the cantilever and, in response to a movement of the optical beam reflected from the cantilever, applying a voltage to a semiconductive circuit element abutting at least one surface of the cantilever. In response to the voltage, the semiconductive circuit element may reduce deflection of the cantilever. The voltage may indicate the strength of the interfacial force between the sample substance and the optical fiber probe.

In yet other embodiments, an apparatus comprises an optical detector configured to detect an optical beam reflected from a cantilever. The apparatus may further comprise a probe suspended from the cantilever and a tray configured to (i) laterally modulate a sample substance in an x-axis direction in relation to the probe, and (ii) move the sample substance in a z-axis direction in relation to the probe. The apparatus may further comprise a feedback controller communicatively coupled to the optical detector and a semiconductive circuit element abutting at least one surface of the cantilever. The cantilever may be configured to deflect in response to a normal interfacial force and a lateral friction force between the sample substance and the optical fiber probe. In response to detecting a movement of the optical beam reflected from the cantilever, the feedback controller may be configured to apply a voltage to the semiconductive circuit element. In response to the voltage from the feedback controller, the semiconductive circuit element may be configured to reduce deflection of the cantilever. The voltage applied by the feedback controller may indicate the strength of the normal interfacial force and the lateral friction force between the sample substance and the optical fiber probe.

The present disclosure provides various technical advantages. Various embodiments may have none, some, or all of these advantages. One advantage is that a cantilever-based optical interfacial force microscope (COIFM) may employ an optical detection technique and a feedback loop to self-balance a cantilever configured to sense interfacial forces in a sample substance. The configuration of the feedback loop and cantilever may provide enhanced sensitivity of the COIFM to interfacial forces.

Another advantage is that the COIFM may comprise a cantilever with an optical fiber probe to measure interfacial forces in a liquid environment. The optical fiber probe may have a sufficient length to allow the free end of the optical fiber probe to penetrate a fluid surrounding a sample substance while the cantilever remains suspended above the fluid. By keeping the cantilever suspended above the fluid, the COIFM may prevent the electrical signals of the feedback loop from affecting the interfacial interactions between the probe and the sample substance. Thus, the COIFM may obtain accurate measurements of intermolecular interactions in a liquid environment.

Yet another advantage is that the COIFM may be configured to laterally modulate a sample substance (e.g., water) while measuring interfacial forces. In some embodiments, the COIFM may measure the normal forces and/or friction forces caused by interfacial liquid structures in ambient environments. Understanding such forces may permit the design of micro-electro-mechanical system (MEMS) devices that reliably operate in humid and/or wet environments.

Other advantages of the present disclosure will be readily apparent to one skilled in the art from the description and the appended claims.

BRIEF DESCRIPTION OF THE DRAWINGS

For a more complete understanding of the present disclosure and its advantages, reference is now made to the following description taken in conjunction with the accompanying drawings, in which.

DETAILED DESCRIPTION

Figure 1:
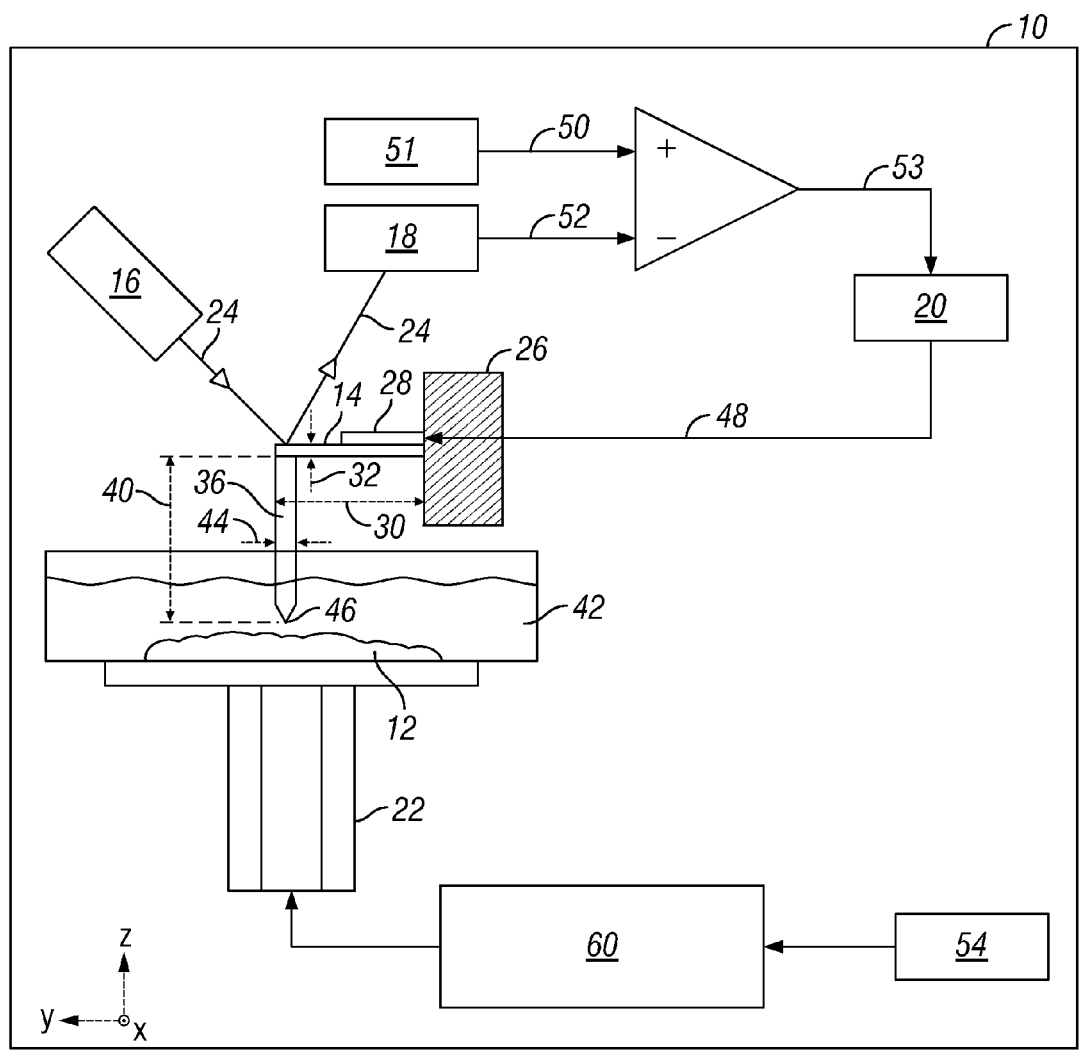
FIG. 1 illustrates a cantilever-based optical interfacial force microscope (COIFM), according to certain embodiments.

FIG. 1 illustrates a cantilever-based optical interfacial force microscope (COIFM) 10, according to certain embodiments. COIFM 10 may be configured to detect and/or measure the interfacial forces between molecules in a sample substance 12. COIFM 10 may employ an optical detection technique and a feedback loop to self-balance a cantilever 14 that senses interfacial forces in the sample substance 12. The configuration of the feedback loop and cantilever 14 may provide enhanced sensitivity of COIFM 10 to interfacial forces. In some embodiments, COIFM 10 may unveil structural and mechanical information regarding a sample substance 12 at the molecular level. COIFM 10 may comprise at least one light source 16, cantilever 14, optical detector 18, feedback controller 20, and piezotube 22.

Light source 16 may emit an optical beam 24 towards cantilever 14. Optical beam 24 from light source 16 may reflect off at least one surface of cantilever 14. Optical detector 18 may be positioned to receive optical beam 24 reflected from cantilever 14. As cantilever 14 is deflected, causing the unsupported end of cantilever 14 to move in the z-axis direction, the angle of reflection of optical beam 24 may change. Based at least in part on the angle of reflection of optical beam 24 from cantilever 14, COIFM 10 may determine the position of cantilever 14.

Light source 16 may comprise any suitable source of electromagnetic radiation. In some embodiments, light source 16 may comprise a laser such as, for example, a semiconductor laser, a solid state laser, a gas laser, a chemical laser, an excimer laser, and/or any suitable type of laser. In other embodiments, light source 16 may comprise a light-emitting diode and/or lamp emitting a low-divergence optical beam 24.

As noted above, light source 16 may emit optical beam 24 towards cantilever 14. Cantilever 14 may comprise a linear member having a fixed end attached to a support 26 and a free end that is not attached to a support. In some embodiments, cantilever 14 may project horizontally from support 26. The application of a force to the free end of cantilever 14 may cause the free end of cantilever 14 to move in the z-axis direction, resulting in deflection of cantilever 14. The application of a force to the free end of cantilever 14 may cause a torque and/or stress (e.g., shear stress, compression, and/or tension) in one or more portions of cantilever 14. In some embodiments, cantilever 14 may comprise a circuit element 28 communicatively coupled to a feedback controller 20 that prevents and/or reduces the deflection of cantilever 14.

Cantilever 14 may comprise any suitable type of structural member. In some embodiments, cantilever 14 may comprise a semiconductive material such as, for example, a doped and/or undoped silicon material. In particular embodiments, cantilever 14 may comprise phosphorus doped silicon and/or boron doped silicon. Cantilever 14 may have any suitable dimensions. In some embodiments, cantilever 14 has a length 30 from eighty (80) to one hundred and eighty (180) micrometers ($\mu$m). In particular embodiments, cantilever 14 has a length 30 from one hundred and twenty (120) to one hundred and thirty (130) $\mu$m. In some embodiments, cantilever 14 has a thickness 32 from two (2) to six (6) $\mu$m. In particular embodiments, cantilever 14 has a thickness 32 from three (3) to five (5) $\mu$m. In some embodiments, cantilever 14 has a width from forty (40) to seventy (70) $\mu$m. In particular embodiments, cantilever 14 has a width from fifty (50) to sixty (60) $\mu$m.

As noted above, cantilever 14 may comprise circuit element 28 that is communicatively coupled to feedback controller 20. In some embodiments, circuit element 28 comprises a semiconductor stack such as, for example, a zinc oxide stack. Circuit element 28 may be positioned near the fixed end (e.g., base) of cantilever 14. In conjunction with cantilever 14, circuit element 28 may act as a bimorph that controls (e.g., prevents and/or reduces) the vertical displacement of the free end of cantilever 14. Feedback controller 20 may use circuit element 28 to provide voltage activated force feedback of cantilever 14. In some embodiments, feedback controller 20 may use circuit element 28 for self-sensing of cantilever 14, for statically deflecting and/or reducing deflection of the free end of cantilever 14, and/or for oscillating and/or reducing oscillation of cantilever 14.

Cantilever 14 in COIFM 10 may be configured to measure intermolecular interactions for various sample substances. In some embodiments, cantilever 14 comprises a probe 36 affixed to the free end of cantilever 14. A sample substance may be positioned on piezotube 22 in proximity to probe 36. Intermolecular interactions between probe 36 and the sample substance 12 may exert a force on cantilever 14, causing a slight deflection of cantilever 14. Optical detector 18 may detect the deflection of cantilever 14. In response to the deflection, feedback controller 20 may adjust the voltage 48 applied to circuit element 28 in order to reduce and/or prevent further deflection of cantilever 14. Based on the voltage 48 required to prevent and/or reduce the deflection of cantilever 14, COIFM 10 may determine the interfacial forces between probe 36 and the sample substance 12. This information may be used to analyze characteristics of sample substances 12 such as, for example, interfacial adhesion, interfacial liquid structures, and/or measurements of chemical interactions.

Probe 36 of cantilever 14 may be any suitable type of probe. In some embodiments, probe 36 may be a semiconductive tip that protrudes vertically from the free end of a horizontally positioned cantilever 14. In such embodiments, probe 36 may be a pyramid-shaped tip that comprises a silicon material. The pyramid-shaped tip may resemble a spike and/or may have any suitable dimensions. For example, the pyramid-shaped tip may have a height from fifteen (15) to twenty (20) $\mu$m.

In other embodiments, probe 36 may be an optical fiber probe 36. The use of an optical fiber probe 36 may allow COIFM 10 to measure interfacial interactions in liquid environments. The optical fiber probe 36 may have a sufficient length 40 to allow the free end of the optical fiber probe 36 to penetrate a fluid 42 surrounding a sample substance 12 while cantilever 14 remains suspended above fluid 42. By keeping cantilever 14 suspended above fluid 42, COIFM 10 prevents the electrical signals of the force feedback loop from affecting the interfacial interactions between the optical fiber probe 36 and the sample substance 12. In other words, by keeping cantilever 14 and force feedback loop isolated from fluid 42, COIFM 10 may obtain accurate measurements of intermolecular interactions associated with the sample substance 12.

The optical fiber probe 36 may comprise any suitable type of optical fiber. For example, the optical fiber probe 36 may comprise a glass fiber, a plastic fiber, and/or any suitable type of optical fiber. One end of the optical fiber probe 36 may be affixed to cantilever 14 while the other end (i.e., the free end) of the optical fiber probe 36 is not affixed to any structure. The optical fiber probe 36 may be affixed to cantilever 14 using any suitable technique. For example, an end of the optical fiber probe 36 may be affixed to cantilever 14 with a thermosetting polymer such as, for example, epoxy. The optical fiber probe 36 may have any suitable dimensions. In some embodiments, the optical fiber probe 36 has a trunk diameter 44 from seventy (70) to one hundred and eighty (180) µm. In particular embodiments, the optical fiber probe 36 has a trunk diameter 44 from one hundred and twenty (120) to one hundred and thirty (130) µm. In some embodiments, the optical fiber probe 36 has a length 40 from one to two centimeters (cm). The free end of the optical fiber probe 36 may be sharpened to form a pointed end 46. In some embodiments, the pointed end 46 of the optical fiber probe 36 has a diameter from fifty (50) to one hundred and fifty (150) nanometers (nm). In particular embodiments, the pointed end 46 of the optical fiber probe 36 has a diameter from eighty (80) to one hundred and twenty (120) nm.

In some embodiments, probe 36 may comprise a wire having a sharpened tip. The tip of the wire may be sharpened according to any suitable technique such as, for example, chemical etching. Probe 36 may comprise any suitable type of wire. For example, probe 36 may comprise tungsten, titanium, chromium, and/or any suitable material.

In some embodiments, probe 36 may be coated with one or more layers of material to insulate probe 36 from liquid. A coating may be deposited over probe 36, cantilever 14, and/or both probe 36 and cantilever 14. The coating may prevent the electrical signals of the force feedback loop in COIFM 10 from affecting the interfacial interactions between probe 36 and the sample substance 12. For example, where probe 36 is a pyramid-shaped silicon tip that extends from cantilever 14, a coating on probe 36 and/or cantilever 14 may allow COIFM 10 to measure interfacial interactions in a liquid environment. To enhance the resolution and/or sensitivity of COIFM 10, the coating may not cover the apex of the tip of probe 36. The coating may comprise any suitable insulating material. For example, the coating may comprise an elastomer (e.g., silicone elastomer, polyisoprene, polyurethane, etc.), a polymer, a polyimide, and/or any suitable material.

As noted above, interfacial forces between probe 36 and the sample substance 12 may cause some deflection of cantilever 14, which may cause a change in the reflection of optical beam 24 from cantilever 14. Optical detector 18 may detect the movement of optical beam 24 reflected from cantilever 14. In some embodiments, optical detector 18 outputs to feedback controller 20 an electrical signal indicating the amount of deflection of cantilever 14. Optical detector 18 may be any suitable device that senses the presence and/or movement of optical beam 24. Optical detector 18 may comprise a transducer that converts an optical signal into an electrical signal. In some embodiments, optical detector 18 may comprise one or more laser detectors, photomultipliers, photodiodes, thermopile detectors, and/or pyroelectric energy detectors.

Feedback controller 20 may receive from optical detector 18 an electrical signal that indicates the deflection of cantilever 14. In response to the electrical signal, feedback controller 20 may adjust the voltage 48 applied to circuit element 28 on cantilever 14 in order to prevent and/or reduce the deflection of cantilever 14. The voltage 48 that is output from feedback controller 20 may be based at least in part on a voltage 50 associated with a set point 51 and a voltage 52 from optical detector 18. In some embodiments, feedback controller 20 may cause circuit element 28 to create a torque on cantilever 14 in order to achieve a zero error voltage 53.

Feedback controller 20 may comprise any suitable type of controller. For example, feedback controller 20 may be a digital controller, an analog controller, a linear gain controller, and/or a non-linear gain controller. In some embodiments, feedback controller 20 may be a proportional integral derivative (PID) controller. The voltage 48 required from feedback controller 20 to prevent and/or reduce the deflection of cantilever 14 may indicate the strength of the interfacial forces between the sample substance 12 and probe 36.

The sample substance 12 may be positioned on piezotube 22 in COIFM 10. Piezotube 22 may be coupled to a z-axis controller 54 and/or an amplifier 60, which may cause piezotube 22 to move the sample substance 12 closer to and/or further from probe 36. Thus, piezotube 22 may move the sample substance 12 in the z-axis direction. The interfacial forces measured by COIFM 10 may depend on the distance between the free end of probe 36 and the sample substance 12.

Piezotube 22 may be any suitable type of piezoelectric actuator. Piezotube 22 may comprise a ceramic and/or crystalline material that, in response to an electric field, changes in size. This property may allow piezotube 22 to position the sample substance 12 with accuracy (e.g., better than micrometer precision) in relation to probe 36 in COIFM 10. Piezotube 22 may be any suitable type of piezoelectric actuator such as, for example, a direct piezo actuator and/or an amplified piezo actuator.

COIFM 10 may be configured to measure intermolecular interactions associated with any suitable type of sample substance 12. For example, the sample substance 12 may comprise one or more biological substances such as, for example, proteins, ligands, cellular systems, and/or bacterial systems. As another example, sample substance 12 may comprise a liquid (e.g., water), which may allow COIFM 10 to measure interfacial fluid structures. As yet another example, sample substance 12 may be a solid, gaseous, and/or plasma substance.

In operation, COIFM 10 may be used to measure intermolecular interactions in a sample substance 12. The sample substance 12 may be positioned on piezotube 22 in COIFM 10. Piezotube 22 may be positioned in proximity to probe 36 suspended from the free end of cantilever 14 in COIFM 10. When COIFM 10 is activated, light source 16 may emit optical beam 24 towards cantilever 14, which may reflect optical beam 24 towards optical detector 18.

COIFM 10 may actuate piezotube 22 in the z-axis direction such that the sample substance 12 on piezotube 22 moves closer to probe 36. The interfacial forces between the molecules in the sample substance 12 and probe 36 may cause probe 36 to move closer to or further from the sample substance 12, which may cause a slight deflection of cantilever 14. The deflection of cantilever 14 may cause optical beam 24 reflected from cantilever 14 to move. The movement of optical beam 24 may be detected by optical sensor, which may, in response, transmit an electrical signal to feedback controller 20. In response to the electrical signal from optical sensor, feedback controller 20 may apply a voltage 48 to circuit element 28 affixed to cantilever 14. By applying a voltage 48 to circuit element 28, feedback controller 20 may prevent and/or reduce the deflection of cantilever 14. Based at least in part on the amount of voltage 48 required to prevent and/or reduce the deflection of cantilever 14, COIFM 10 may determine and/or indicate the strength of the interfacial forces in the sample substance 12.

Figure 2A:
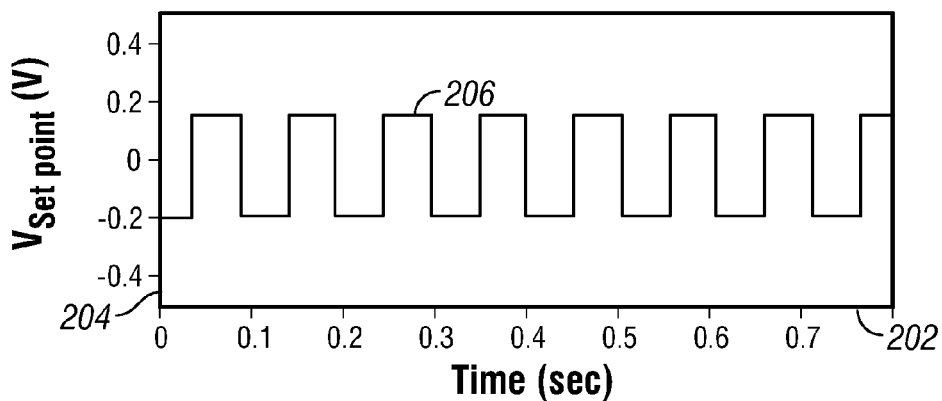
FIGS. 2A to 2D are graphs that illustrate the relationships of example electrical signals in a COIFM, according to certain embodiments.
Figure 2B:
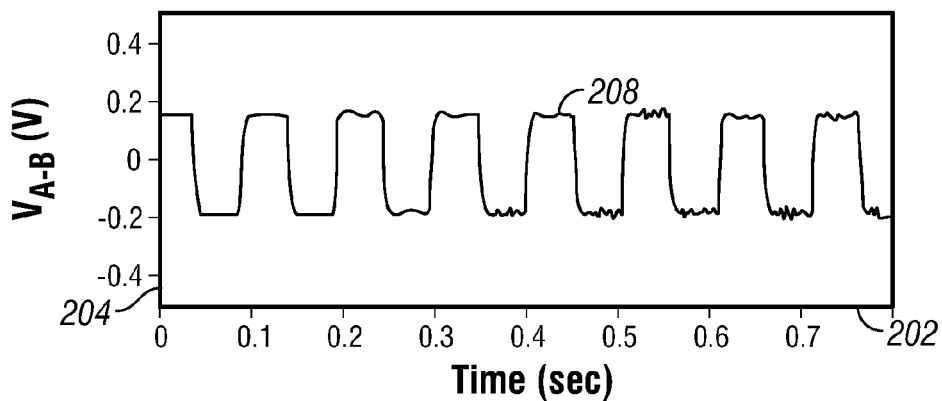
Figure 2C:
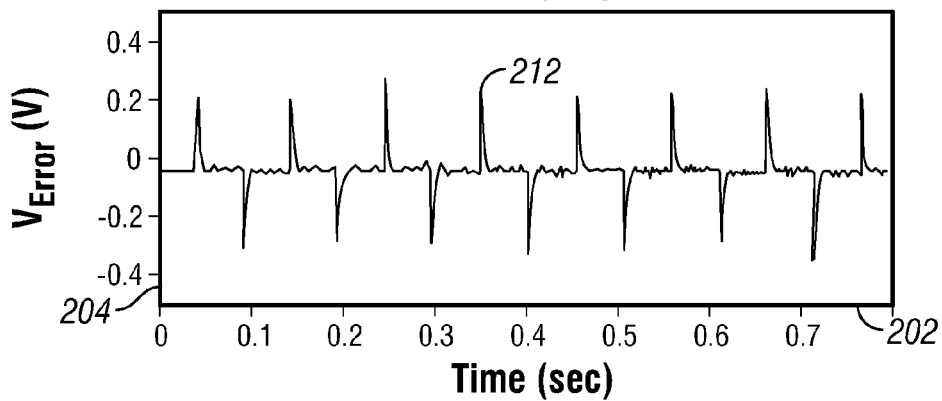
Figure 2D:
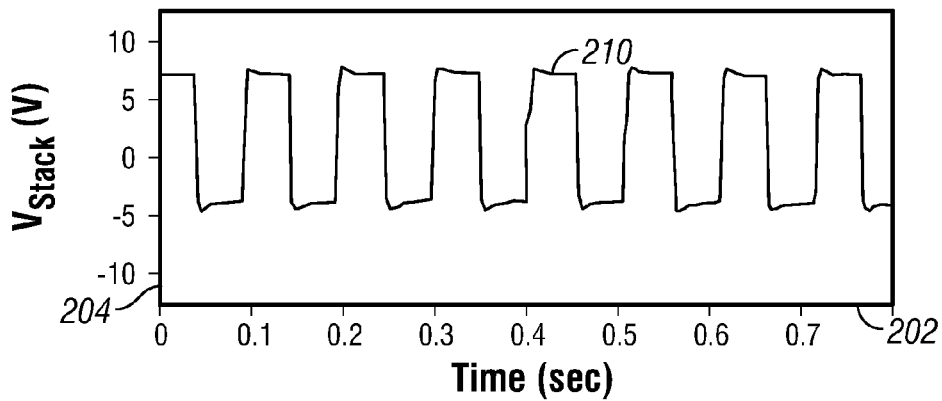

FIGS. 2A to 2D are graphs that illustrate the relationship of example electrical signals in COIFM 10, according to certain embodiments. The x-axis 202 of each graph represents time and the y-axis 204 of each graph represents a respective voltage in the feedback loop in COIFM 10. Electrical signals in COIFM 10 may be adjusted to determine the time resolution of COIFM 10. For example, as illustrated in FIG. 2A, when the sample substance 12 is not in proximity to probe 36, COIFM 10 may apply a square wave voltage with a particular amplitude (e.g., 0.2 V) and frequency (e.g., 10 Hz) to the set-point voltage ($V_{set\ point}$) 206. As illustrated in FIG. 2B, feedback controller 20 may be operable to configure the preamp output ($V_{A-B}$) 208 to follow the square wave by applying appropriate voltages ($V_{stack}$) 210 to circuit element 28 affixed to cantilever 14. The square wave may cause circuit element 28 to create a torque on cantilever 14 in order to achieve a zero error voltage ($V_{error}$) 212, as illustrated in FIG. 2C. Thus, feedback controller 20 may be configured to optimize the transient response to achieve the appropriate time response for COIFM 10. As illustrated in FIG. 2D, COIFM 10 may, in some embodiments, have a practical time resolution that is between one and two milliseconds (ms).

Although particular voltage levels and time resolutions are described above, it should be understood that COIFM 10 may be configured to operate with any suitable voltage levels and time resolutions.

Figure 3A:
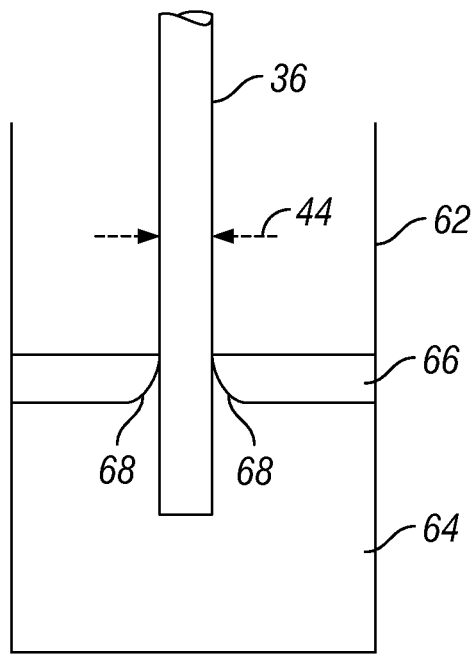
FIGS. 3A and 3B illustrate the formation of an optical fiber probe for a COIFM, according to certain embodiments.
Figure 3B:
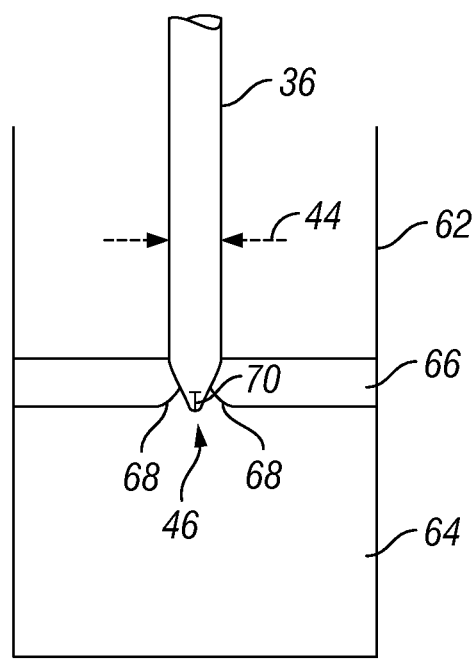

FIGS. 3A and 3B illustrate the formation of an optical fiber probe 36 for COIFM 10, according to certain embodiments. In some embodiments, a pointed end 46 may be formed on the optical fiber probe 36 by an acid etching technique.

As noted above, an optical fiber probe 36 may comprise any suitable type of optical fiber. In some embodiments, the optical fiber used to form the optical fiber probe 36 may be uncoated. In other embodiment, a coated optical fiber may be selected, and the coating may then be stripped from at least a portion of the optical fiber. The coating of the optical fiber may be removed by any suitable technique such as, for example, by using a wire stripping device.

The optical fiber may have any suitable trunk diameter 44. In some embodiments, the trunk diameter 44 of the uncoated optical fiber may be from seventy (70) to one hundred and eighty (180) μm. In particular embodiments, the trunk diameter 44 may be from one hundred and twenty (120) to one hundred and thirty (130) μm.

To form a pointed end 46 on the optical fiber probe 36, an uncoated optical fiber may be positioned vertically in a container 62. Container 62 may be any suitable type of container such as, for example, an acid resistant beaker. Once the optical fiber probe 36 is positioned in container 62, an acid 64 may be added to container 62. A sufficient quantity of acid 64 may be added such that acid 64 immerses the free end of the optical fiber probe 36. Acid 64 may be any suitable type of acid 64 such as, for example, a monoprotic acid and/or a polyprotic acid. In some embodiments, acid 64 may be a mineral acid, a sulfonic acid, and/or a carboxylic acid. In particular embodiments, acid 64 may be a hydrofluoric acid and/or a hydrochloric acid.

After acid 64 is added to container 62, a solvent 66 may be added to container 62. Solvent 66 may be less dense and/or immiscible in acid 64. Consequently, solvent 66 may form a separate layer of fluid over acid 64. The layer of solvent 66 may serve as a protective barrier to the optical fiber probe 36 so that only a controlled portion of the optical fiber probe 36 is dissolved and/or sharpened by acid 64.

Solvent 66 may be any suitable type of solvent 66 that is less dense than acid 64 and/or immiscible in acid 64. For example, solvent 66 may be an aromatic hydrocarbon such as, for example, toluene and/or benzene. As another example, solvent 66 may be hexane and/or cyclohexane.

In some embodiments, acid 64 in container 62 may form a meniscus 68 on the optical fiber probe 36. Meniscus 68 may recede as acid 64 dissolves the material (e.g., glass) in the optical fiber. Due to the formation of meniscus 68, more material (e.g., glass) may be dissolved at the immersed (e.g., distal) end of the optical fiber, which may result in the continuous narrowing of the optical fiber to create a pointed end 46. The pointed end 46 of the optical fiber may have any suitable diameter 70. In some embodiments, the diameter 70 of the pointed end 46 may be from fifty (50) to one hundred and fifty (150) nm.

The optical fiber probe 36 may be left in container 62 for any suitable period of time (e.g., sixty minutes, ninety minutes, etc.) to form the pointed end 46. Once the pointed end 46 is formed, the optical fiber probe 36 may be removed from container 62 and cleaned. In some embodiments, the pointed end 46 of the optical fiber probe 36 may be polished and/or annealed. Annealing may align the molecules in the pointed end 46 of the optical fiber probe 36 to enhance the accuracy of measurements by COIFM 10.

Although an acid etching technique is described above, it should be understood that any suitable technique may be used to form the pointed end 46 on the optical fiber probe 36. For example, the pointed end 46 on the optical fiber probe 36 may be formed by milling, dry etching, vapor etching, and/or any suitable technique. In some embodiments, the pointed end 46 may be formed on the optical fiber probe 36 by thermal heating of the optical fiber with a laser (e.g., a carbon dioxide laser). In other embodiments, the pointed end 46 may be formed on the optical fiber probe 36 by resistive heating.

In some embodiments, COIFM 10 may be used to analyze interfacial liquid structures in an ambient environment. To analyze interfacial liquid structures, COIFM 10 may measure the normal force and/or the friction force between probe 36 in COIFM 10 and the sample substance 12. Measuring the normal force may permit COIFM 10 to monitor the adhesion between probe 36 and the sample substance 12. Measuring the friction force may allow COIFM 10 to monitor the ordering of molecules in the sample substance 12. In some embodiments, the friction force may be measured by laterally modulating the sample substance 12 as it is brought into proximity with probe 36.

Figure 4:
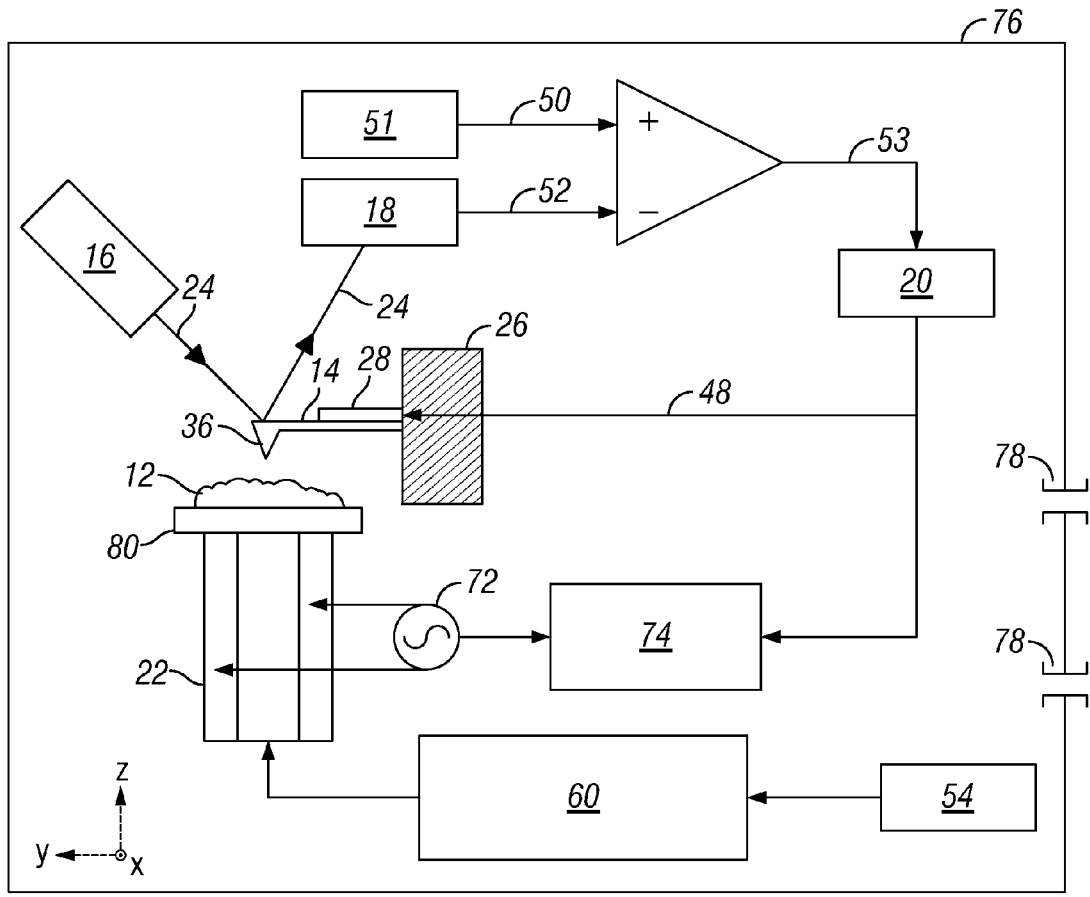
FIG. 4 illustrates a COIFM configured to analyze interfacial liquid structures by laterally modulating a sample substance, according to certain embodiments.

FIG. 4 illustrates COIFM 10 configured to analyze interfacial liquid structures by laterally modulating the sample substance 12, according to certain embodiments. COIFM 10 may comprise light source 16, cantilever 14, optical detector 18, feedback controller 20, and piezotube 22, as described above with respect to FIG. 1. COIFM 10 may further comprise a lateral modulator 72 and lock-in amplifier 74 communicatively coupled to piezotube 22 and feedback controller 20.

Lateral modulator 72 may be operable to modulate piezotube 22 in the x-axis and/or y-axis directions. Lateral modulator 72 may comprise a voltage supply that is configured to actuate the modulation of piezotube 22. Lateral modulator 72 may be any suitable modulator such as, for example, a piezoelectric actuator. For example, piezotube 22 may comprise a ceramic structure that contracts and/or expands in the x-axis and/or y-axis directions in response to a voltage applied by the voltage supply in lateral modulator 72.

Lateral modulator 72 may be communicatively coupled to lock-in amplifier 74. Lock-in amplifier 74 may be operable to detect and/or measure the lateral modulation of piezotube 22. Lock-in amplifier 74, which may act as a homodyne with a low pass filter, may be operable to extract a signal with a known carrier wave from a noisy environment. Lock-in amplifier 74 may be operable to convert the phase and amplitude of the extracted signal into a time-varying, low-frequency voltage signal. In some embodiments, lock-in amplifier 74 may be configured to measure phase shift associated with the extracted signal.

In operation, COIFM 10 may laterally modulate the sample substance 12 to gather information regarding interfacial liquid structures in the sample substance 12. In some embodiments, a sample substance 12 (e.g., a fluid) may be deposited on piezotube 22. COIFM 10 may then establish a feedback loop between optical detector 18 and circuit element 28 on cantilever 14. Piezotube 22 may then be actuated in the z-axis direction such that the sample substance 12 is brought near to and/or in contact with the free end of probe 36 in COIFM 10. As the sample substance 12 is brought into proximity with probe 36, adhesion forces between the sample substance 12 and probe 36 may cause cantilever 14 to deflect. Optical detector 18 may detect the deflection of cantilever 14. Based on signals from optical detector 18 and feedback controller 20, COIFM 10 may measure the adhesions forces between the sample substance 12 and probe 36.

Figure 5:
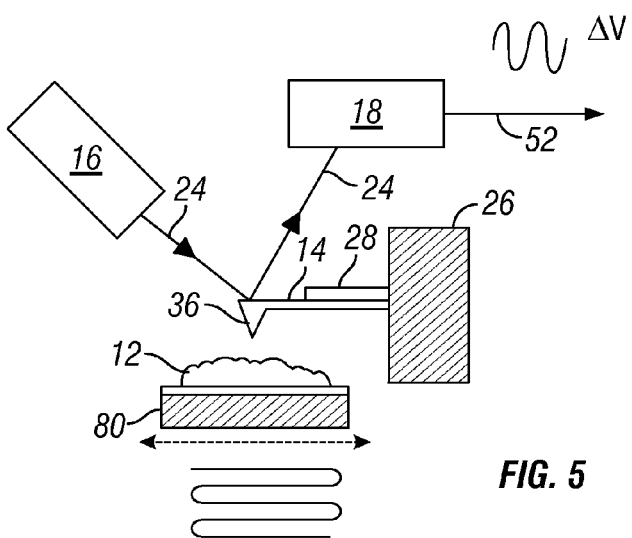
FIG. 5 illustrates the lateral modulation of a tray in a COIFM, according to certain embodiments.

As illustrated in FIG. 5, piezotube 22 may be modulated laterally (e.g., in the x-axis and/or y-axis directions) as piezotube 22 moves the sample substance 12 into contact with probe 36. As the sample substance 12 approaches and retracts from probe 36, lock-in amplifier 74 may detect a voltage signal that indicates the effect of friction forces between the sample substance 12 and probe 36. In some embodiments, COIFM 10 may indicate and/or record information regarding the normal forces, friction forces, and/or the distance between probe 36 and the sample substance 12.

An example illustrates certain embodiments of COIFM 10. In some embodiments, COIFM 10 may measure the effect of interfacial water in micro-electro-mechanical system (MEMS) devices. In such devices, the presence of water may hinder the movement and/or function of micro-electro-mechanical structures. Understanding the effects of interfacial water in MEMS devices may enable designing MEMS devices that effectively operate in humid and/or wet environments.

In the present example, water may be deposited on a tray 80 (e.g., silicon substrate) on piezotube 22 in an ambient environment, as illustrated in FIG. 4. COIFM 10 may be equipped with probe 36 that comprises a silicon tip. COIFM 10 may be placed in an enclosure 76 (e.g., an acryl box) having at least one inlet port 78 for dry nitrogen gas and at least one inlet port 78 for humid water vapor. Appropriate levels of nitrogen gas and water vapor may then be added to enclosure 76 to control the amount of humidity.

In the present example, COIFM 10 may establish a feedback loop between optical detector 18 and circuit element 28 on cantilever 14. Lateral modulator 72 may modulate piezotube 22 in the x-axis and/or y-axis directions as piezotube 22 moves in the z-axis direction to bring the water into contact with probe 36. COIFM 10 may measure both the normal forces and the friction forces between the water and probe 36. COIFM 10 may collect and/or record data as piezotube 22, while modulating, approaches and retracts from probe 36.

In the present example, chains of water molecules may form between probe 36 and tray 80 on piezotube 22. When tray 80 on piezotube 22 is in proximity to the silicon tip of probe 36, the normal forces and friction forces caused by the water chains may oscillate. As the gap distance decreases between probe 36 and tray 80, the force response of the water chains may resemble the force response of a polymer (as opposed to the force response of a spring).

In some embodiments, the water molecules confined between probe 36 and tray 80 on piezotube 22 may form a bundle of water chains through hydrogen bonding. The length of each chain may be approximated by a model called "freely jointed chain" (FJC), in which the individual segments of each water chain move randomly. The FJC model may be expressed by the following equation:

$$\langle z_t \rangle = l \cdot \sigma \left[ \coth\left(\frac{f_l}{n} \cdot \frac{\sigma}{k_B T}\right) - \left(\frac{n}{f_l} \cdot \frac{k_B T}{\sigma}\right) \right]$$

In the foregoing equation, l may represent the number of water joints, σ may represent the diameter of water, f may represent tip force, n may represent the number of water chains, $k_B$ may represent the Boltzmann constant, and T may represent temperature. Applying the FJC model in the present example, the measurements by COIFM 10 may indicate that, as probe 36 approaches tray 80 on piezotube 22, the number of water chains between probe 36 and silicon substrate may increase while the number of water joints in each chain may decrease.

Although the foregoing example describes the use of COIFM 10 to measure interfacial forces associated with water chains, it should be understood that COIFM 10 may be used to measure interfacial forces in any suitable substance.

The present disclosure encompasses all changes, substitutions, variations, alterations and modifications to the example embodiments described herein that a person having ordinary skill in the art would comprehend. Similarly, where appropriate, the appended claims encompass all changes, substitutions, variations, alterations, and modifications to the example embodiments described herein that a person having ordinary skill in the art would comprehend.

What is claimed is:

1. An apparatus, comprising:
   an optical detector configured to detect an optical beam reflected from a cantilever;
   an optical fiber probe, wherein the optical fiber probe is affixed to and suspended from the cantilever;
   a piezotube configured to move a sample substance immersed in a liquid in proximity to the optical fiber probe, wherein the optical fiber probe has a first end that is immersed in the liquid and a second end that is affixed to the cantilever, and the cantilever and the second end of the optical fiber probe are positioned outside of the liquid, and further wherein the cantilever is configured to deflect in response to an interfacial force between the sample substance and the optical fiber probe;
   a feedback controller communicatively coupled to the optical detector and to a semiconductive circuit element abutting at least one surface of the cantilever, wherein:
      in response to detecting a movement of the optical beam reflected from the cantilever, the feedback controller is configured to apply a voltage to the semiconductive circuit element;

in response to the voltage from the feedback controller, the semiconductive circuit element is configured to reduce deflection of the cantilever; and the voltage applied by the feedback controller is indicative of a strength of the interfacial force between the sample substance and the optical fiber probe.

2. The apparatus of claim 1, wherein:

the sample substance is a biological material in a liquid environment; and the interfacial force is caused by bio-molecular interactions between the sample substance and the optical fiber probe.

3. The apparatus of claim 1, wherein:

the semiconductive circuit element abutting the at least one surface of the cantilever is a zinc oxide stack; and the feedback controller is a proportional integral derivative (PID) controller.

4. The apparatus of claim 1, wherein the optical fiber probe comprises an uncoated glass fiber having a first end that is affixed to the cantilever and a distal end that is formed into a point, the glass fiber having a length sufficient to permit the distal end to be immersed in a liquid while the cantilever remains outside of the liquid.

5. The apparatus of claim 1, further comprising a laser source configured to emit the optical beam towards the cantilever.

6. The apparatus of claim 1, wherein the voltage applied by the feedback controller causes the semiconductive circuit element to exert sufficient torque on the cantilever to counterbalance the interfacial force between the sample substance and the optical fiber probe.

7. A method, comprising:

positioning a sample substance immersed in a liquid in proximity to an optical fiber probe, wherein the optical fiber probe is affixed to and suspended from a cantilever, wherein the optical fiber probe has a first end that is immersed in the liquid and a second end that is affixed to the cantilever, and the cantilever and the second end of the optical fiber probe are positioned outside of the liquid, and further wherein an interfacial force between the sample substance and the optical fiber probe causes the cantilever to deflect;

detecting an optical beam reflected from the cantilever;

in response to a movement of the optical beam reflected from the cantilever, applying a voltage to a semiconductive circuit element abutting at least one surface of the cantilever, wherein:

in response to the voltage, the semiconductive circuit element reduces deflection of the cantilever; and the voltage is indicative of a strength of the interfacial force between the sample substance and the optical fiber probe.

8. The method of claim 7, wherein:

the sample substance is a biological material in a liquid environment; and the interfacial force is caused by bio-molecular interactions between the sample substance and the optical fiber probe.

9. The method of claim 7, wherein:

the semiconductive circuit element abutting the at least one surface of the cantilever is a zinc oxide stack;

the optical beam is detected by an optical detector; and the voltage is applied to the semiconductive circuit element by a proportional integral derivative (PID) controller communicatively coupled to the optical detector.

10. The method of claim 7, wherein the optical fiber probe comprises an uncoated glass fiber having a first end that is affixed to the cantilever and a distal end that is formed into a point, the glass fiber having a length sufficient to permit the distal end to be immersed in a liquid while the cantilever remains outside of the liquid.

11. The method of claim 7, wherein the voltage causes the semiconductive circuit element to exert sufficient torque on the cantilever to counterbalance the interfacial force between the sample substance and the optical fiber probe.

12. The apparatus of claim 1, wherein the optical fiber probe is affixed to the cantilever with an epoxy.

13. The apparatus of claim 1, wherein the cantilever has an insulative coating comprising at least one of (a) an elastomer, (b) a polymer, and (c) a polyimide.

14. The apparatus of claim 1, wherein the cantilever comprises at least one of (a) phosphorus doped silicon, and (b) boron doped silicon.

15. The apparatus of claim 1, wherein the cantilever does not transmit light.

16. The method of claim 7, wherein the optical fiber probe is affixed to the cantilever with an epoxy.

17. The method of claim 7, wherein the cantilever has an insulative coating comprising at least one of (a) an elastomer, (b) a polymer, and (c) a polyimide.

18. The method of claim 7, wherein the cantilever comprises at least one of (a) phosphorus doped silicon, and (b) boron doped silicon.

* * * * *